United States Patent [19]
Manikowski, Jr. et al.

[11] Patent Number: 5,899,175
[45] Date of Patent: May 4, 1999

[54] HYBRID ELECTRIC-COMBUSTION POWER PLANT

[75] Inventors: Ambrose F. Manikowski, Jr., Cupertino; Gary M. Noland, Pleasanton, both of Calif.

[73] Assignee: Procyon Power Systems, Inc., Alameda, Calif.

[21] Appl. No.: 08/819,581

[22] Filed: Mar. 14, 1997

[51] Int. Cl.$^6$ ........................................... F02B 43/08
[52] U.S. Cl. ........................................ 123/3; 123/DIG. 12
[58] Field of Search ................................ 123/3, DIG. 12

[56] References Cited

U.S. PATENT DOCUMENTS

| | | |
|---|---|---|
| 3,296,449 | 1/1967 | Plust et al. . |
| 4,070,993 | 1/1978 | Chen . |
| 4,143,620 | 3/1979 | Noguchi et al. . |
| 4,147,136 | 4/1979 | Noguchi et al. . |
| 4,147,142 | 4/1979 | Little et al. . |
| 4,185,966 | 1/1980 | Frie et al. . |
| 4,362,137 | 12/1982 | O'Hare . |
| 4,597,363 | 7/1986 | Emelock . |
| 4,722,303 | 2/1988 | Leonhard . |
| 4,735,186 | 4/1988 | Parsons . |
| 4,862,836 | 9/1989 | Chen et al. . |
| 4,884,531 | 12/1989 | Degnan, Jr. et al. . |
| 5,159,900 | 11/1992 | Dammann ........................... 123/3 |
| 5,248,566 | 9/1993 | Kumar et al. . |
| 5,409,784 | 4/1995 | Bromberg et al. ................... 429/13 |
| 5,425,332 | 6/1995 | Rabinovich et al. ................ 123/3 |
| 5,435,274 | 7/1995 | Richardson, Jr. .................... 123/3 |
| 5,692,459 | 12/1997 | Richardson, Jr. ............... 123/DIG. 12 |
| 5,744,015 | 4/1998 | Mazanec et al. ................... 204/295 |

FOREIGN PATENT DOCUMENTS

| | | |
|---|---|---|
| 0334474 | 9/1989 | European Pat. Off. . |
| 0485922 | 5/1992 | European Pat. Off. . |
| 1402207 | 8/1975 | United Kingdom . |
| 1447835 | 9/1976 | United Kingdom . |

OTHER PUBLICATIONS

*Patent Abstracts of Japan*, Apr. 27, 1985, vol. 009, No. 099 (E–311), and JP 59224074 A., Mitsubishi Jukogyo KK, Dec. 15, 1984, (see abstract).

*Gasoline–Reforming Fuel Cell*, Automotive Engineering, Feb. 2, 1997, vol. 105, No. 2, p. 151/152, XP000682325.

*Patent Abstracts of Japan*, Apr. 17, 1985, vol. 009, No. 087 (M–372), and JP 59213940, Nissan Jidosha KK, Dec. 3, 1984 (see abstract).

Boggs et al., "The Otto–Atkinson cycle engine—full economy and emissions results and hardware design" *SAE Technical Paper 950089* (1955). 14 pages total.

Luria et al., "The Otto–Atkinson engine—a new concept in automotive economy" *SAE Technical Paper 820352* (1982). 8 pages total.

Saunders et al., "Variable valve closure timing for load control and the Otto Atkinson cycle engine" *SAE Technical Paper 890677* (1989). 12 pages total.

Blakey et al., "A design and experimental study of an Otto Atkinson cycle engine using late intake valve closing" *SAE Technical Paper 910451* (1991). 10 pages total.

*Primary Examiner*—John T. Kwon
*Attorney, Agent, or Firm*—Morrison & Foerster LLP

[57] ABSTRACT

This is a procedure for producing power and a hybrid power generation unit for practicing such a process. In particular, the procedure uses a thermal or catalytic cracker to partially crack or partially pyrolyze a liquid petroleum fuel to produce a gaseous stream containing hydrogen (and perhaps methane or other short-chain hydrocarbons) and a liquid hydrocarbon intermediate fuel. The hydrogen is then used in a fuel cell to produce electricity which then used in a linear or rotary electric motor. The intermediate liquid fuel is then fed to an internal or external combustion engine for further production of mechanical power. Most preferred of the combustion engines is one running on an Atkinson cycle.

34 Claims, 3 Drawing Sheets

HYBRID ELECTRIC-COMBUSTION POWER PLANT

FIELD OF THE INVENTION

This invention is a procedure for producing mechanical power and a hybrid power generation unit for practicing such a process. In particular, the procedure uses a thermal or catalytic cracker partially to crack or to pyrolyze a liquid petroleum fuel to produce a gaseous stream containing hydrogen (and perhaps methane or other short-chain hydrocarbons) and to produce a liquid partially dehydrogenated hydrocarbon intermediate fuel. The hydrogen is used in a fuel cell to produce electricity, which electricity is used in a linear or rotary electric motor. The intermediate liquid fuel is fed to an internal or external combustion engine for further production of mechanical power. Most preferred of the combustion engines is one running on an Atkinson cycle.

This combination of pyrolysis, fuel cell, and high efficiency heat engine results in a procedure and device which is significantly more efficient in terms of utilizing the energy present in the feedstock hydrocarbon fuel.

BACKGROUND OF THE INVENTION

The vast majority of all engine-driven vehicles in operation today use internal combustion engine using either a Diesel cycle or the Otto cycle. A very few automotive vehicles are powered by external combustion engines such as gas turbines or steam engines. An increasing number of vehicles are powered by electric motors.

Each class of motor vehicle propulsion system has its benefits and detriments. The Diesel cycle engines are simple and robust while utilizing significant amount of the energy found in its hydrocarbon fuel. The exhaust on most such diesel cycle engines is high in nitrogen oxides and carbon particulates. The Otto cycle engines are probably the most highly engineered mechanical device existing on earth. Although the efficiency of Otto cycle power plants as used in automotive vehicles has significantly improved since their first use in the latter part of the 19th century, their efficiency (based on the potential energy content of the fuel) is not high. In general, these engines can be made into quite lightweight packages for use in a variety of vehicles.

Vehicles using electric motors are currently not as flexible and practical as are those using one of the internal combustion engine power plants. Although acceleration and top speed of such electric vehicles may match those of internal combustion-engined vehicles, electric motor-powered vehicles have a significant detriment because of their need for batteries. A variety of different battery systems have been proposed for use in such vehicles. Lead-sulfuric acid batteries remains the choice for such vehicles. Obviously, lead-acid batteries are quite heavy and often have a lengthy charging cycle. Such cars have a short vehicle range. Unlike the internal combustion engined vehicles, those powered with electric motors have few if any vehicular emissions. Obviously though, the utility power plants which provide electric power to battery-powered electric cars will be responsible for some type of emission.

Many have attempted to minimize the emissions emitted by internal combustion engines by maximizing the efficiency of such devices through modification of the fuel prior to combustion.

Such procedures include steam reforming or partial oxidation of portions of the fuel. Our process involves partial pyrolysis of the fuel.

Steam Reforming

Petroleum fuels may be reformed using steam to yield hydrogen. The procedure requires two mols of water and heat to decompose thermally the hydrocarbon according to the following reaction:

$$CH_x + 2H_2O \rightarrow CO_2 + (x/2+2)H_2$$

Using methane as a feedstock, x=4 and the theoretical hydrogen yield is four mols of hydrogen for each mol of methane fed to a reactor. The reaction is endothermic so that the theoretical heat required is 61.8 Kcal/gm-mol, the heat of combustion of methane is 191 Kcal/gm-mol, and the hydrogen efficiency is 91%. At equilibrium conditions, only about 2.55 mols of hydrogen is produced and therefore the hydrogen efficiency is reduced to 76%.

For a typical liquid petroleum fuel such as heptane, x=2.29, the theoretical hydrogen yield is 3.15 mols of hydrogen per mol of heptane, the heat required is 53.8 Kcal/gm-mol, the heat of combustion of heptane is 153 Kcal/gm-mol, and the hydrogen efficiency is 88%. However, at equilibrium conditions, the hydrogen production is reduced to 2.6 mols, and the corresponding hydrogen efficiency is reduced to 74%. This approach results in the highest hydrogen efficiency since some of the hydrogen is supplied by the steam which is broken down in the reforming reaction.

Partial Oxidation

In the partial oxidation of petroleum fuels, a portion of the fuel is burned to provide heat to decompose the fuel and water in an oxygen-starved environment, thus:

$$CH_x + (1.5-x/8)H_2O + \tfrac{1}{4}(1+x/4)H_2 \rightarrow CO_2 + (1.5+3x/8)H_2 + \text{heat}$$

For methane:

$$CH_4 + H_2O + \tfrac{1}{2}O_2 \rightarrow CO_2 + 3H_2 + 29.48 \text{ Kcal/gm-mol}$$

The theoretical hydrogen efficiency for methane is 78% and at equilibrium conditions expected hydrogen efficiency at 64%. Using heptane as a feedstock, x=2.29 and the resulting equation is:

$$CH_{2.29} + 1.21H_2O + 0.39O_2 \rightarrow CO_2 + 2.36H_2 + 25.1 \text{ Kcal/gm-mol}$$

The theoretical hydrogen efficiency is 77% and at equilibrium the hydrogen efficiency falls to 60%.

Partial oxidation has a moderately high hydrogen efficiency since some portion of the hydrogen contained in the feedstock is combusted in this reaction scheme.

Pyrolysis

Pyrolysis is the direct thermal decomposition of petroleum according to the following equation:

$$CH_x + \text{heat} \rightarrow C + x/2 H_2$$

For methane it is simply:

$$CH_4 + \text{heat} \rightarrow C + 2H_2$$

The heat required to decompose methane is about 18.9 Kcal/gm-mol and the corresponding theoretical hydrogen efficiency is 55%. Under equilibrium conditions, one could expect to extract about 90% of the hydrogen contained in the methane and the hydrogen efficiency is therefore reduced to 50%.

Using heptane, the reaction comes the following:

$$CH_{2.29} + heat \rightarrow C + 1.14 H_2$$

The heat required in this reaction is 18 Kcal/gm-mol and the theoretical efficiency based on hydrogen is 40%. Experiments have shown that 90% of hydrogen can be recovered, thus reducing the overall hydrogen efficiency to 36%.

The pyrolysis process has the lowest hydrogen efficiency since only the hydrogen contained in hydrocarbon feedstock is available. It, however, has the advantage of being free of carbon monoxide and carbon dioxide gases which require further processing before utilization by fuel cells. Further, carbon monoxide is a reactive pollutant which must be combusted in an oxygen-rich atmosphere to meet the requirements for various transportation applications.

With the background stated above: U.S. Pat. No. 4,070,993 (to Chen) describes a process for cracking a low octane fuel to produce a gaseous product of substantially higher octane value which is then fed directly to an internal combustion engine. The partially hydrogenated gas generally contains gases of $C_5^-$ for use in the engine. Conversion is shown in the examples to be 60% or greater. The remainder is presumably coke on the catalyst.

U.S. Pat. No. 4,862,836 (to Chen et al.) shows a similar process but one involving a dual converter involving a partial combustion of a fuel in the presence of oxygen. This partial combustion is necessary to sustain the heat required by the conversion, which conversion is apparently a partial oxidation or other similar reaction.

Other systems for reforming fuel prior to its combustion in an internal combustion engine are shown in variety of patents. For instance, U.S. Pat. No. 4,143,620 (Noguchi et al.) shows a fuel reforming system in which the catalyst used to reform the fuel is placed in heat exchange with the exhaust gas emanating from the engine. The fuel is preferably methanol. The methanol is partially sent to a carburetor where it is ignited in conjunction with a hydrogen-rich fuel stream which is produced by reforming the remainder of the methanol.

U.S. Pat. No. 4,147,136 (to Noguchi et al.) show a similar process but one in which the feedstock is instead hydrocarbon. The process utilizes a fuel reforming system which burns a portion of its hydrocarbon fuelstock to maintain a reforming reaction vessel at an appropriately high temperature. The remainder of the fuel is fed to that reforming reactor vessel. The resulting reformed gaseous mixture contains a substantial amount of hydrogen. The inclusion of hydrogen in the reformed gaseous mixture is said to facilitate a reliable ignition and combustion of that reformed mixture of the reformed mixture along with a non-reformed hydrocarbon fuel. This process allows the use of a lean air-to-fuel ratio which is further said to result in the lowering of HC, CO, and $NO_x$ emissions.

U.S. Pat. No. 4,147,142 (to Little et al.) describes a procedure for both modifying the physical state and chemical composition of a fuel prior to its combustion. The modification step includes vaporization of the liquid fuel and use of the heat from the engine's exhaust also to thermally crack the fuel passing to the combustion process.

U.S. Pat. No. 4,185,966 (to Frie et al.) shows a device for reforming an vaporized or atomized, liquid, higher hydrocarbon stream with an oxygen containing gas at an elevated temperature to form a gas mixture containing methane, carbon monoxide, and hydrogen. The product of the reformed gas generator is admixed with an exhaust stream and fed to an internal combustion engine.

U.S. Pat. No. 4,722,303 (to Leonhard) shows a method for using the heat of the exhaust gas to decompose methanol feedstock into a hydrogen and carbon monoxide. This decomposed gas is injected directly into an internal combustion engine and, it is said, that by doing so towards the end of the compression cycle, an overall efficiency increase of 30% (as compared to a Diesel cycle engine) may be obtained.

U.S. Pat. No. 4,735,186 (to Parsons) also describes the procedure for cracking hydrocarbon fuel and passing it, along with a portion of the exhaust gas produced by combustion, along to the combustion chamber in an internal combustion engine.

None of these procedures show partial pyrolysis of hydrocarbon fuel, a separate conversion of the hydrogen stream formed by that pyrolysis in a fuel cell to produce electrical energy, and the simultaneous use of the reduced-hydrogen content fuel in a combustion engine.

Other procedures are known for the production of hydrogen which is further used as fuel in an internal combustion engine.

U.S. Pat. No. 4,362,137 (to O'Hare) shows an alternative fuel mixture, ignition, and an induction system in which an increased burning rate is achieved by directing conventional fuel through a pyrolysis cell and a cooler on its way to the combustion chamber. During such a passage, the fuel is partially stripped of its hydrogen and the so-stripped fuel is passed into the cell during the compression cycle.

A somewhat exotic process is shown in U.S. Pat. No. 4,597,363 (to Emelock) in which oxalic acid, dispersed glycerol, and formic acid is heated at a higher temperature to form hydrogen. The hydrogen is used directly in the fuel cell to produce electricity or as fuel for an internal combustion engine.

Again, none of these procedures show the central concept of using the partial pyrolysis of a hydrocarbon fuel to produce a hydrogen stream which is used in an electrical fuel cell to produce electricity and to use the remaining partially pyrolyzed fuel in an internal or external combustion engine.

SUMMARY OF THE INVENTION

This invention deals with a procedure for generating power and a hybrid power generating unit of interrelated components used to practice that procedure. The procedure involves partial pyrolysis, either by thermal or catalytic means, of a liquid hydrocarbon to produce a gaseous stream containing hydrogen and to produce a partially pyrolyzed liquid intermediate fuel stream. The hydrogen-containing stream is fed to a fuel cell so to produce electric energy. Electric energy in turn is used in an electric motor to produce mechanical power.

The partially pyrolyzed intermediate liquid fuel is passed to an internal or external combustion engine so to produce mechanical power. This hybrid system offers superior fuel economy up to 150% greater than that provided by conventional internal combustion engines. This is particularly true when the intermediate, partially pyrolyzed liquid hydrocarbon is used in an efficient heat engine, such as an Atkinson cycle engine.

The pyrolysis reactor, which may be thermal or catalytic, is operated in such a way that preferably up to about 20% of the available $H_2$ is produced in the hydrogen stream. The balance of the pyrolyzed liquid fuel is then fed to the combustion heat engine. The use of pyrolysis or cracking to produce a hydrogen-rich stream avoids complications found in other known processes such as partial oxidation. The carbon oxides produced by these other processes simply need not be dealt with in a pyrolysis procedure. The hydrogen-rich stream may be fed directly to a fuel cell without appreciable further treatment.

Use of the inventive procedure permits use of many different fuels. Although hydrogen-rich hydrocarbons such as alkanes and branched alkanes are specially suitable as feedstocks for this process, any typical, commercial fuel is suitable, e.g, gasolines, gasoline blending components such as alkylates, crude distillation products such as kerosene, and the like. Furthermore, the absence of oxygen in any form in the reactor prevents the formation of CO and $CO_2$ and hence the gas stream may be used directly in a fuel cell for the production of electricity without substantial intermediate treatment. A small amount of ethylene or methane in the $H_2$ is not detrimental.

The so-called intermediate liquid hydrocarbon fuel from which some portion of the hydrogen has been removed remains quite suitable for use in wide variety of internal and external combustion heat engines. However, it is most preferred that the remaining liquid fuel be used with an efficient heat engine such as an Atkinson cycle engine.

DESCRIPTION OF THE INVENTION

Figure 1:
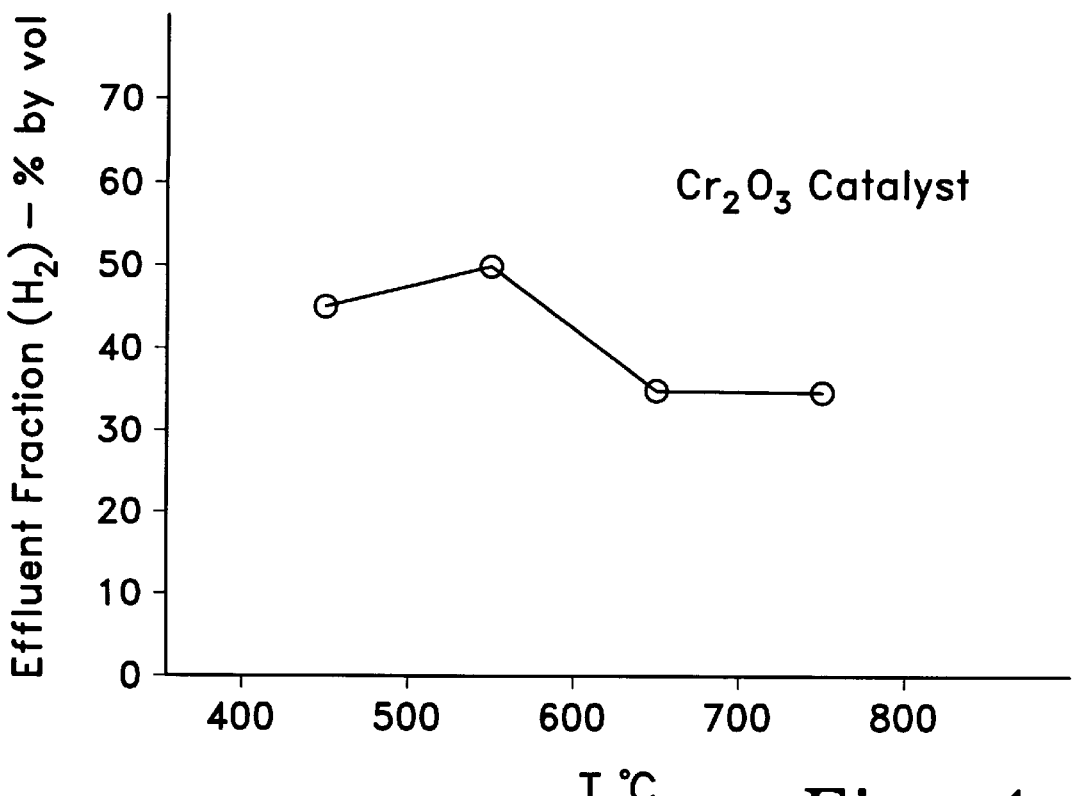
FIG. 1 shows a graph of the relationship between products and temperature of reaction for a specific hydrocarbon feedstock and catalyst.

As noted above, this invention is both a procedure for generation of mechanical power and a hybrid power generation unit for practicing that procedure. Central to the invention is the use of a fuel pyrolysis unit for partially pyrolyzing a liquid hydrocarbonaceous fuel to form a gaseous stream preferably containing a large amount of hydrogen and also to produce a liquid cracked, partially dehydrogenated, or pyrolyzed fuel stream. The procedure also uses a fuel cell for converting a least portion of the $H_2$ in the gaseous fuel stream to electrical current which is subsequently used in an electrical conversion unit such as a rotary or a linear electric motor. The residual liquid pyrolyzed fuel stream is used in a combustion engine which also produces a mechanical motion. This combination of partial pyrolysis reactor, fuel cell, electric motor, and combustion engine results in a power unit capable of thermal conversion efficiencies exceeding 50%. This efficiency compares favorably to 38% conversion efficiency for the better diesel engine electric generators and 45% for the best of typical utility power plants.

The heat engine used in this electrical power generation unit may be used directly to power the drive wheels of a vehicle or maybe used to run an electrical generator for the production of electrical power so to run a single electrical motor.

This procedure is intended to produce only gasses and liquid materials for use within the unit itself. No solids or carbon oxides are desired. Only occasional regeneration of a catalyst to remove carbonaceous deposits may be needed.

Pyrolysis Reactor

Central to this invention is a reactor for the dissociation of feedstock hydrocarbonaceous material. The reactor may be either thermal or catalytic in nature. Thermal pyrolysis reactors are well known in the art and catalytic pyrolysis or low temperature cracking reactors are similarly well known.

In essence, the reactor is one which dissociates hydrogen from hydrocarbon fuels and separates the hydrogen gas thus-produced into a separate stream for further use with the fuel cells discussed below. The reactor is preferably operated in such a way that the remaining pyrolyzed or partially dehydrogenated fuel is liquid in form and may be passed to the heat engine portion of the hybrid power generation unit, also as discussed below. This reactor is based on pyrolysis; thermal composition in the absence of oxygen. In particular, the inclusion of oxygen into the reactor is to be avoided. Pyrolysis does require the external heat for decomposition. We have found that the heat necessary for pyrolysis of suitable hydrocarbon fuels to produce a $H_2$ stream containing perhaps 20% of the available $H_2$ from the included hydrocarbon fuel is in the neighborhood of 5% or less of the fuels' total heating value. This allows the use of a variety of liquid hydrocarbon fuels, e.g., JP-4, JP-8, gasoline or other petroleum fuels while offering redundant energy devices for system reliability and flexibility.

It may be suitable to think of the feed hydrocarbon fuels as sources of high density hydrogen. That is to say that the density of liquid $H_2$ at cryogenic temperatures of 20° Kelvin is in the neighborhood of four lb/ft³. In contrast, compressed natural gas (CNG) has a hydrogen density of two lb/ft³. Most suitable and available liquid fuels such as diesel fuel and gasoline have hydrogen densities of 5.7 to 5.8 lb/ft³. Liquid natural gas (LNG) has a high density of 6.5 lb/ft³. Of course, this procedure and the pyrolysis reactor are intended only partially to pyrolyze the liquid hydrocarbonaceous fuel feeds in order to utilize perhaps 20% of the available hydrogen in the fuel. The remainder of the fuel is obviously still available for the internal combustion engine.

The reactor uses generally low temperature, partial or incomplete pyrolysis of the hydrocarbon fuels so to produce the liquid intermediate residual fuel and high purity hydrogen gas. It is inevitable, perhaps, that the hydrogen gas will contain a small quantity of methane or other short chain hydrocarbons. We have found that by operating the reactor at temperatures below 600° C., the products produced fall within the general criteria described above. This low temperature operation also minimizes the amount of carbon that accumulates in the reactor and minimizes the need for later decoking operations. For example, hydrocarbon such as pentane (a low octane component of gasoline) may be pyrolyzed according to the following formula:

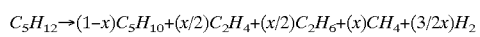

$$C_5H_{12} \rightarrow (1-x)C_5H_{10} + (x/2)C_2H_4 + (x/2)C_2H_6 + (x)CH_4 + (3/2x)H_2$$

The ratios of each of the noted products are simply dependent upon the temperature of reaction. As discussed below, we have found that by maintaining the temperature for pentane at a temperature below 550 to 600° C. that the pyrolysis is quite simple and produces high amounts of pentene ($C_5H_{10}$) and hydrogen. As the temperature is increased, the mid-chain cracking reactions begin to become more predominant, therefore producing more ethylene and ethane along with the fragment methane. These cracking reactions take place at the detriment of the production of hydrogen. At suitably low temperatures, no (or nearly no) elemental carbon is produced. These reactions are thermodynamically limited and the endpoints are typically easily calculable for such simple systems using minimization of the Gibbs free energy function.

Catalysts may be used to accelerate the rate of pyrolysis and in some instances accelerate the selection of products to non-equilibrium product compositions. The catalysts which may be placed in the hydrocarbonaceous fuel pyrolysis unit include solid materials comprising one or more of the metals selected from Group Va, VIa, VIIa, VIII, IIIb, and the Lanthanide series of the Periodic Table. It is desirable to place these materials on a refractory substrate such as alumina, chromia, zirconia, silica-alumina, magnesia, silica-magnesia, thoria, beryllia, titania, or the like. Other matrix materials such as clays, silicas or other naturally occurring materials are also suitable. Montmorillonite and kaolins are also known supports. Obviously it is desirable that these materials be provided with a significant amount of porosity.

Zeolitic materials may be used either as shape selective supports or simply as porous materials depending upon the cage sizes inherent in those materials. A selection of potentially suitable zeolites is shown in U.S. Pat. No. 4,862,836, to Chen et al, mentioned above.

Branched alkanes are especially suitable for use as feedstocks to this procedure because of their high hydrogen density. Pentane was mentioned above as a component included in gasoline. Obviously other materials typically found in diesel fuel mixes and gasolines are also suitable.

Group VIII metals on supports such as chromia or alumina are currently preferred.

EXAMPLES

Examples of a product mix made using catalytic pyrolysis reactors and gross hydrogen reaction rate are shown in the following examples. In each instance, a fixed bed reactor containing the catalyst was heated to temperature noted in the attendant figures and the stream of pentane was introduced. The content of the product stream was also measured.

The catalyst used in the run shown in FIG. 1 was a simple chromia catalyst. It should be noted that the effluent fraction of the hydrogen was highest at a temperature below about 600°. Very little coking was noted in that temperature range.

Figure 2:
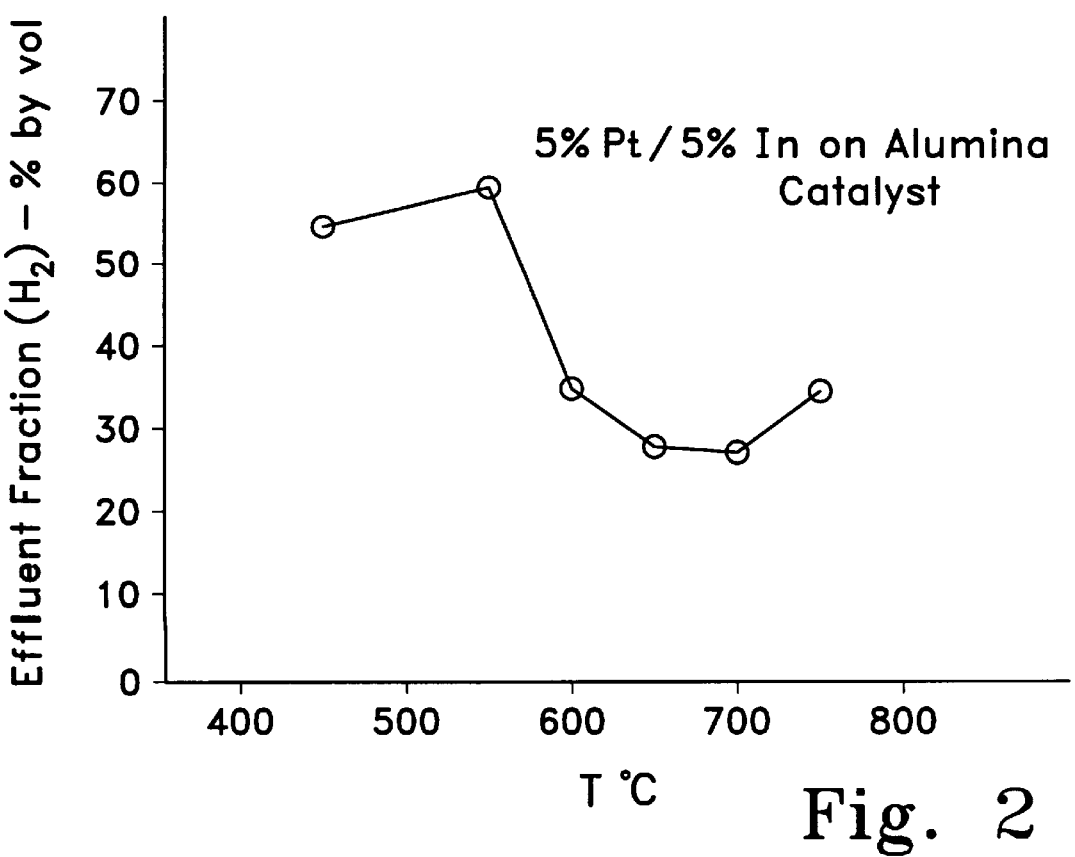
FIG. 2 shows a graph of the relationship between products and temperature of reaction for a specific hydrocarbon feedstock and catalyst.

Similarly, the data shown in FIG. 2 show that for a catalyst made up of a 5% platinum and a 5% indium on an alumina support, the results are quite similar. The hydrogen percentage in the effluent gas is highest at temperatures which are modest.

Figure 3:
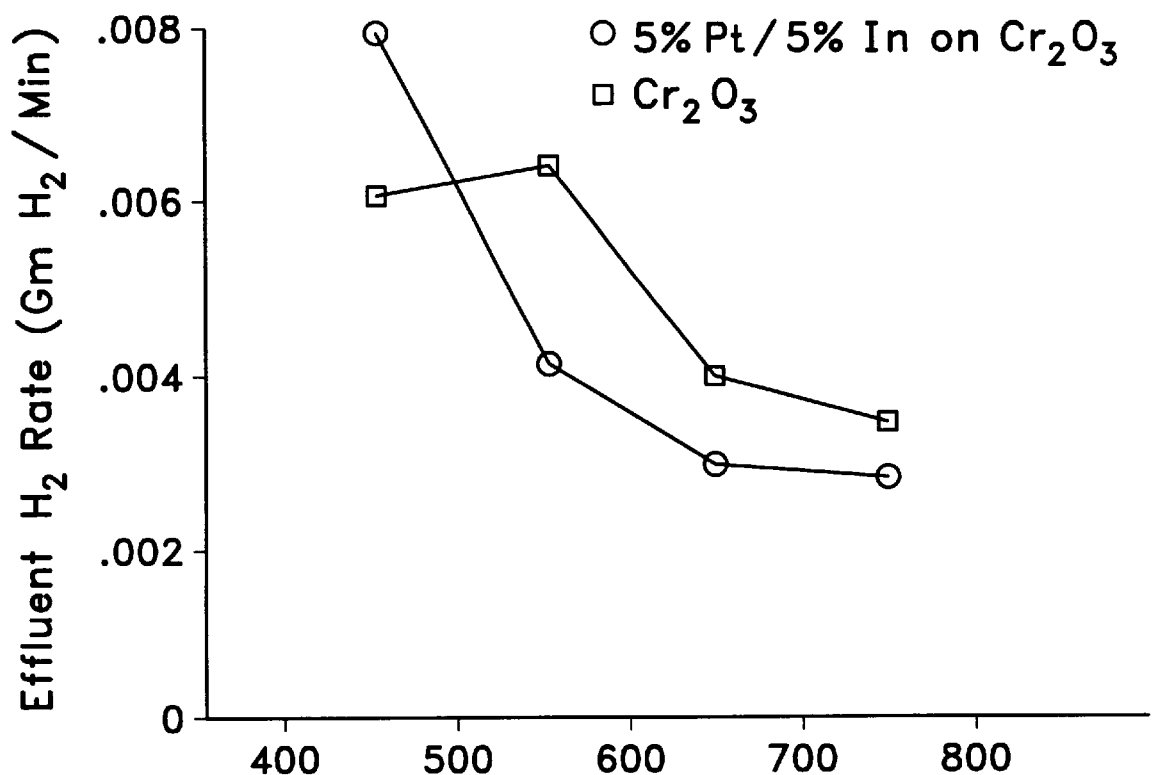
FIG. 3 shows a graph of the relationship between $H_2$ production rate and temperature of reaction for a specific hydrocarbon feedstock and catalyst.

Finally, FIG. 3 shows that the hydrogen production rate (in grams of hydrogen per minute) is, perhaps, expectedly higher at the lower temperature range.

Although a catalyst permits the use of smaller reaction vessels and have, therefore, quite desirable attributes in their use in a vehicle, simple thermal pyrolysis reactors are also quite useful. The layout of a pyrolysis reactor is not seen as particularly critical. It should involve simply passage of heat from the heat source as discussed above, preferably through the use of indirect heat exchange. Again, the temperature should be maintained in the temperature range of 350° to 600° C., more preferable 450 to 575° C., and most preferably 500 to 550° C. to achieve optimum amounts and production of hydrogen from alkyl-based fuel stocks. The ancillary equipment associated with reactor need not be particularly complicated. Since the temperature reaction is significantly higher than most of the boiling points for the liquids introduced into the reactor, some means for condensation of the residual, partially de-hydrogenated hydrocarbon reactor effluent is desired. Such condensation could take place through the use of feed-effluent heat exchangers. Baffling to prevent carryover of liquid into the hydrogen stream is obviously a desirable aspect. The hydrogen stream is thereafter taken to the fuel cell noted below, which fuel cell is generally sized for production rate of hydrogen chosen as a design basis for the particular fuel involved. This need not be so, however, since in situations where the hydrogen production outstrips the ability of the fuel cell to accept the hydrogen produced by the pyrolysis reactor, the hydrogen may be simply diverted to the heat engine for use as a thermal fuel.

It is within the scope of this invention to separate products such as methane and ethylene and higher chain length hydrocarbonaceous materials from the hydrogen stream prior to their entrance to the fuel cell if needed or desired. Such separation may be desired since fuel cell efficiency can decrease significantly if nonreactive inerts such as nitrogen and methane are included in the feed hydrogen. On the other hand, if modest amounts of methane may be tolerated in the fuel cell, the fuel cell itself may act as a concentrator for the methane and its subsequent recycle back to the heat engine discussed below.

As a final point, because of the sublimely mixed hydrocarbons found in fuel such as gasoline and diesel fuel, some amount of carbonaceous material or coke will be found over time in the pyrolysis reactor. Typical coke precursors might be alkenes, which are somewhat hydrogen deficient prior to their passage into the pyrolysis reactor. But whatever the source, the reactor should be provided with some means for decoking the reactor. Typically, this may be as simple as a port for introduction of air into the reactor at high temperature so to burn off the coke. More elegant solutions include the introduction of steam and oxygen so to perform a partial oxidation of the carbon into carbon monoxide and hydrogen for use in the heat engine as a fuel. Some thought should be had for each individual design to determine whether the added complication of partial oxidation as a regeneration step is needed. Typically, the controlling factor will the nature of the fuels involved.

Figure 4:
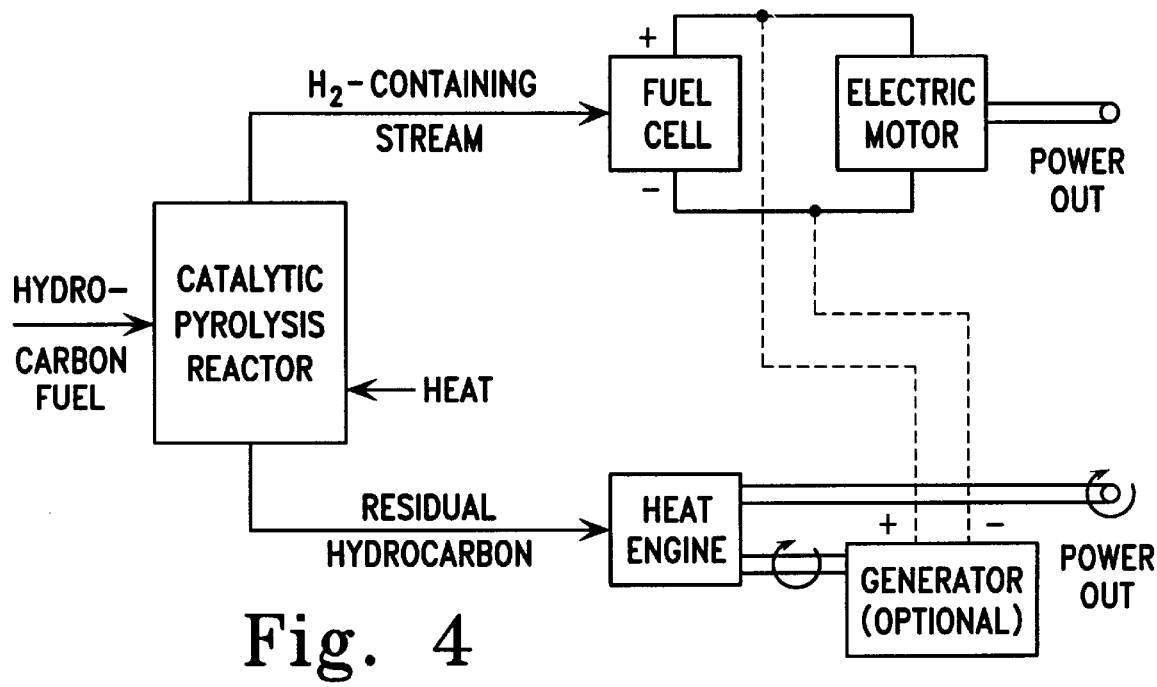
FIG. 4 shows schematic diagram for a hybrid power unit made according to the invention.

FIG. 4 is a schematic outline of the assembly in process using a single stage of pyrolysis. As is apparent from the Figure, a hydrocarbonaceous fuel, preferably one with a high hydrogen content (H/C ratio of 1.5:1—about 3:1) is fed to the pyrolysis reactor as discussed above. The hydrogen containing stream (perhaps containing a modest amount of methane) is introduced to the fuel cell where electricity is generated and may be fed then to electric motor. The residual hydrocarbon stream containing less bonded hydrogen is then fed to the heat engine where such fuel is used to power the engine. The heat engine may be either tied to an optional generator and the electrical power from that generator used to power the electrical motor in conjunction with the electricity emanating from the fuel cell or the heat engine may be used directly as a prime mover for the vehicle in question.

Figure 5:
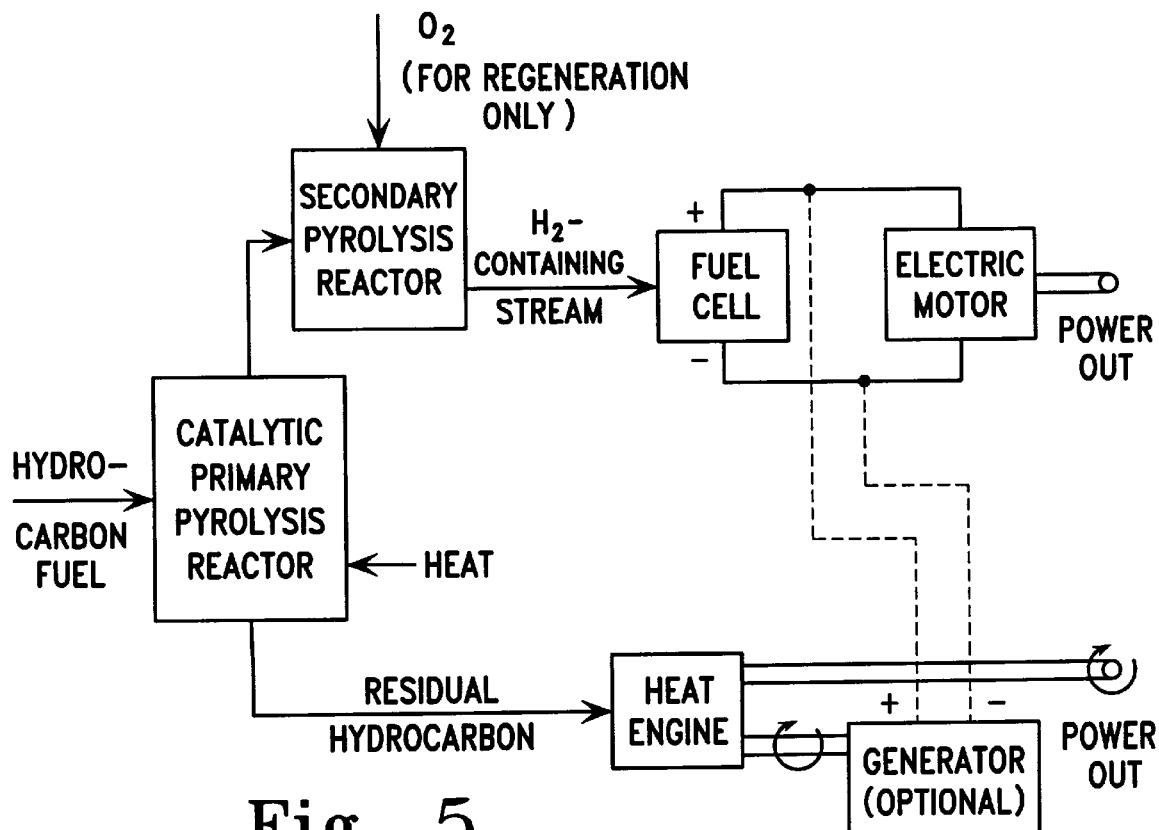
FIG. 5 shows an alternative schematic diagram for a hybrid power unit made according to the invention. This variation uses a multi-stage pyrolysis reaction.

FIG. 5 shows a variation of this invention in which the fuel cell, electric motor, heat engine, and generator (optional) are used as discussed above in conjunction with FIG. 4. In this variation, the primary pyrolysis reactor may be operated at a slightly higher temperature so to cause a higher percentage of cracking reactions. In this way, although the amount of non-condensible hydrocarbons (methane, ethane, ethylene, etc.) found in the hydrogen stream is increased, the overall amount of hydrogen for the two stage pyrolysis is similarly increased. In this variation, the gas stream from the primary pyrolysis reactor is subjected to a second pyrolysis reaction. The secondary pyrolysis reaction may be run at a higher temperature, e.g., 600° C.–700° C., so to further pyrolyze the hydrocarbons and strip hydrogen therefrom. This, of course, means that some carbon is left as coke in the secondary pyrolysis reactor. At some time, the secondary pyrolysis reactor must be taken off-line for decoking. The decoking step may take the form of a simple oxidation (or "burn") or a partial oxidation as mentioned above. Since the secondary pyrolysis reactor will likely contain more carbon than the variation shown in FIG. 4, a partial oxidation reaction may be desirable.

Fuel Cell-Electric Motor

Fuel cells are well known devices for producing electricity using a power of association from hydrogen to oxygen in producing electric current. They are known to work best with a stream of hydrogen which is pure. Diluents such as nitrogen, methane and the like have a tendency to lower the efficiency of the fuel cells. This technology is well known and consequently details of its construction are not included here.

Similarly, the construction of electric motors need not be explained in great detail herein. The electric motor needed for this device will obviously be sized for the amount of hydrogen produced, the size of the fuel cell provided, and the size of the vehicle (or other load such as a generator for home power generation or the like) present in the application.

Heat Engine

Similarly, the heat engine utilized in this procedure is not overly critical although it is highly preferred that one having high thermal efficiency such as one operating in the Atkinson cycle be utilized. Few practical Atkinson cycle engines are currently publicly described but such are preferred. Atkinson cycle engines are discussed in, e.g., SAE Technical Paper 950089, "THE OTTO-ATKINSON CYCLE ENGINE— FUEL ECONOMY AND EMISSIONS RESULTS AND HARDWARE DESIGN", by Boggs et al and SAE Technical Paper 820352, "THE OTTO-ATKINSON ENGINE—A NEW CONCEPT IN AUTOMOTIVE ECONOMY".

Heat engines using internal combustion and involving the Diesel cycle or Otto cycle are also suitable either for driving the wheels on a land vehicle, the propeller on a boat, or (as shown in FIGS. 4 and 5), the optional generator. External combustion engines such as gas turbine and steam cycle engines are also useful but not as desired.

In summary, this invention is a procedure and device for operating the procedure in which high thermal efficiency may be attained by partially pyrolyzing liquid fuelstock to produce an intermediate fuelstock and hydrogen stream. This partial pyrolysis provides for higher efficiencies than do any of comparable procedures for generating mechanical motion from hydrocarbons.

Finally, it is to be understood that various alterations, modifications, and additions may be introduced into the power generation unit and process of using it as described above without departing from the spirit of the invention as claimed below.

We claim as our invention:

1. A hybrid power generation unit comprising:
   a.) a hydrocarbonaceous fuel pyrolysis unit for partially pyrolyzing a hydrocarbonaceous fuel to form a first gaseous stream containing $H_2$ and to form a partially dehydrogenated fuel stream,
   b.) a fuel cell for converting at least a part of the first gaseous stream containing $H_2$ to an electrical current,
   c.) an electrical conversion unit for converting at least a portion of the electrical current from said fuel cell to a first motion, and
   d.) a combustion engine for converting at least a portion of the partially dehydrogenated fuel stream to a second motion.

2. The hybrid power generation unit of claim 1 wherein the hydrocarbonaceous fuel pyrolysis unit comprises at least one catalyst mass containing a solid catalyst for partially pyrolyzing said hydrocarbonaceous fuel to form said first gaseous stream comprising $H_2$ and said partially dehydrogenated fuel stream.

3. The hybrid power generation unit of claim 2 wherein the solid catalyst comprises one or more metals selected from Group Va, VIa, VIIa, VIII, IIIb, and Lanthanide series of the Periodic Table.

4. The hybrid power generation unit of claim 3 wherein the solid catalyst comprises said one or more metals on a refractory substrate.

5. The hybrid power generation unit of claim 4 wherein the solid catalyst comprises platinum and indium on alumina.

6. The hybrid power generation unit of claim 1 wherein the hydrocarbonaceous fuel pyrolysis unit is noncatalytic and further comprises a heat source for partially pyrolyzing said hydrocarbonaceous fuel to form said first gaseous stream comprising $H_2$ and said partially dehydrogenated fuel stream.

7. The hybrid power generation unit of claim 6 wherein the hydro carbonaceous fuel pyrolysis unit comprises at least two stages, a heat source for partially pyrolyzing said hydrocarbonaceous fuel to form said first gaseous stream comprising $H_2$ and an intermediate hydrocarbon stream in said first stage, said second stage for further cracking any hydrocarbons contained in said first gaseous stream comprising $H_2$ into a second gaseous stream comprising $H_2$.

8. The hybrid power generation unit of claim 1 wherein the electrical conversion unit for converting at least a portion of the electrical current from said fuel cell to a first motion is an electric motor and the first motion is rotary.

9. The hybrid power generation unit of claim 1 wherein the electrical conversion unit for converting at least a portion of the electrical current from said fuel cell to a first motion is a linear electric motor and the first motion is linear.

10. The hybrid power generation unit of claim 1 wherein the combustion engine is an internal combustion engine.

11. The hybrid power generation unit of claim 10 wherein the internal combustion engine is a Diesel cycle engine.

12. The hybrid power generation unit of claim 10 wherein the internal combustion engine is an Otto cycle engine.

13. The hybrid power generation unit of claim 10 wherein the internal combustion engine is a Atkinson cycle engine.

14. The hybrid power generation unit of claim 10 wherein the combustion engine is an external combustion engine.

15. The hybrid power generation unit of claim 14 wherein the external combustion engine is a gas turbine.

16. The hybrid power generation unit of claim 1 wherein the electrical conversion unit is an electric motor having a rotary shaft, the first motion is rotary, the combustion engine has a rotary power shaft and the second motion is rotary.

17. A process for generating power comprising the steps of:
- a.) partially pyrolyzing a hydrocarbonaceous feed to form a first gaseous stream containing $H_2$ and a partially dehydrogenated fuel stream,
- b.) introducing at least a part of the first gaseous fuel stream containing $H_2$ to a fuel cell for producing an electrical current,
- c.) introducing at least a portion of the electrical current from said fuel cell to an electrical conversion unit to produce a first motion, and
- d.) introducing at least a portion of the partially dehydrogenated fuel stream to a combustion engine to produce a second motion.

18. The process of claim 17 wherein the partial pyrolyzing step is catalytic and said hydrocarbonaceous fuel is passed over at least one catalyst mass containing a solid catalyst.

19. The process of claim 18 wherein the solid catalyst comprises one or more metals selected from Group Va, VIa, VIIa, VIII, IIIb, and Lanthanide series of the Periodic Table.

20. The process of claim 19 wherein the solid catalyst comprises said one or more metals on a refractory substrate.

21. The process of claim 20 wherein the solid catalyst comprises platinum and indium on alumina.

22. The process of claim 17 wherein the partial pyrolyzing is noncatalytic and said process further comprises a heat source for partially pyrolyzing said hydrocarbonaceous fuel to form said first gaseous stream comprising $H_2$ and said liquid partially dehydrogenated fuel stream.

23. The process of claim 17 wherein the first gaseous stream comprising $H_2$ is further partially dehydrogenated into a second gaseous stream comprising $H_2$ for passage to said fuel cell.

24. The process of claim 17 wherein the pyrolysis is carried out at a temperature less than about 600° C.

25. The process of claim 17 wherein the pyrolysis is carried out at a temperature of 450 to 575° C.

26. The process of claim 17 wherein the pyrolysis is carried out at a temperature of 550 to 550° C.

27. The process of claim 17 wherein the step of introducing at least a portion of the partially dehydrogenated fuel stream to a combustion engine comprises introducing said stream to an internal combustion engine.

28. The process of claim 17 wherein the step of introducing at least a portion of the partially dehydrogenated fuel stream to a combustion engine comprises introducing said stream to a Diesel cycle engine.

29. The process of claim 17 wherein the step of introducing at least a portion of the partially dehydrogenated fuel stream to a combustion engine comprises introducing said stream to an Otto cycle engine.

30. The process of claim 17 wherein the step of introducing at least a portion of the partially dehydrogenated fuel stream to a combustion engine comprises introducing said stream to an Atkinson cycle engine.

31. The process of claim 17 wherein the step of introducing at least a portion of the partially dehydrogenated fuel stream to a combustion engine comprises introducing said stream to an external combustion engine.

32. The process of claim 17 wherein the step of introducing at least a portion of the partially dehydrogenated fuel stream to a combustion engine comprises introducing said stream to a gas turbine.

33. The hybrid power generation of claim 17 wherein the hydrocarbonaceous feed is liquid.

34. The hybrid power generation of claim 17 wherein the partially dehydrogenated fuel stream is liquid.

\* \* \* \* \*